(12) United States Patent
Andresen et al.

(10) Patent No.: US 8,404,189 B2
(45) Date of Patent: Mar. 26, 2013

(54) OXYGEN/HYDROCARBON RAPID (HIGH SHEAR) GAS MIXER, PARTICULARLY FOR THE PRODUCTION OF ETHYLENE OXIDE

(75) Inventors: Harvey E. Andresen, Luling, LA (US); Christopher P. Christenson, Lake Jackson, TX (US); Charles W. Lipp, Lake Jackson, TX (US); John R. Mayer, The Woodlands, TX (US); Thomas J. Kling, Midland, MI (US); Victor R. Fey, West Bloomfield, MI (US); Laurence G. Britton, Charleston, WV (US); Michael J. Rangitsch, Saginaw, MI (US); Michael L. Hutchison, Poca, WV (US)

(73) Assignee: Dow Technology Investments LLC, Midland, MI (US)

( * ) Notice: Subject to any disclaimer, the term of this patent is extended or adjusted under 35 U.S.C. 154(b) by 386 days.

(21) Appl. No.: 12/678,270

(22) PCT Filed: Nov. 12, 2008

(86) PCT No.: PCT/US2008/012714
§ 371 (c)(1),
(2), (4) Date: Mar. 15, 2010

(87) PCT Pub. No.: WO2009/078899
PCT Pub. Date: Jun. 25, 2009

(65) Prior Publication Data
US 2010/0191005 A1   Jul. 29, 2010

Related U.S. Application Data

(60) Provisional application No. 61/007,790, filed on Dec. 14, 2007.

(51) Int. Cl.
*B01F 3/02* (2006.01)
*B01F 5/04* (2006.01)
*B01J 12/00* (2006.01)
*B01J 19/24* (2006.01)

(52) U.S. Cl. ........ 422/224; 366/336; 366/341; 239/429; 239/430; 239/432

(58) Field of Classification Search .................. 422/224; 366/336, 341; 239/429, 430, 432
See application file for complete search history.

(56) References Cited

U.S. PATENT DOCUMENTS
2,614,616 A   10/1952 Villoresi et al.
(Continued)

FOREIGN PATENT DOCUMENTS
DE   102005020942 A1 * 11/2006
(Continued)

OTHER PUBLICATIONS
PCT International Preliminary Report on Patentability, PCT International Application No. PCT/US2008/012715, mailed Mar. 29, 2010.
(Continued)

*Primary Examiner* — Jennifer A Leung
(74) *Attorney, Agent, or Firm* — McDonnell Boehnen Hulbert & Berghoff LLP

(57) ABSTRACT

A gas mixer is disclosed which includes a vessel (10) (e.g., pipe) containing a stream (12) of a first hydrocarbon-containing gas. The mixer includes a hollow pipe (14) located internal to the vessel containing a stream of a second gas, e.g., an oxygen-containing gas stream such as a stream of pure oxygen gas or air enriched with oxygen. The internal pipe further includes a mixer tip (30) at the peripheral end thereof. The mixer tip includes a body having an internal passage for conducting the second gas out of the pipe and an opening introducing the second gas stream into the first gas stream in a radial plane at an acute angle relative to the longitudinal axis of the pipe. The pipe further includes a deflector (20) on its external surface in longitudinal alignment with the opening of the mixer tip. The deflector serves to deflect any entrained particles within the first gas stream away from the mixing zone where the two streams mix, minimizing the risk of ignition of the hydrocarbon-containing gas.

14 Claims, 2 Drawing Sheets

U.S. PATENT DOCUMENTS

| | | | |
|---|---|---|---|
| 2,981,747 | A | 4/1961 | Lang et al. |
| 2,998,465 | A | 8/1961 | Drummond et al. |
| 3,081,818 | A | 3/1963 | Braconier et al. |
| 3,237,923 | A | 3/1966 | Turner |
| 3,518,284 | A | 6/1970 | Foster |
| 3,570,471 | A | 3/1971 | Lazaridis |
| 3,702,619 | A | 11/1972 | Son |
| 3,706,534 | A | 12/1972 | Verheul et al. |
| 4,012,469 | A | 3/1977 | Accortt |
| 4,256,604 | A | 3/1981 | Aida et al. |
| 4,348,476 | A | 9/1982 | Hou |
| 4,390,346 | A | 6/1983 | Cramer et al. |
| 4,393,817 | A | 7/1983 | Lindberg |
| 4,415,508 | A | 11/1983 | Aida et al. |
| 4,564,298 | A * | 1/1986 | Gritters et al. ............. 366/173.2 |
| 4,573,803 | A | 3/1986 | Gritters et al. |
| 4,634,459 | A | 1/1987 | Pischinger et al. |
| 4,926,620 | A | 5/1990 | Donle |
| 5,037,619 | A | 8/1991 | Alagy et al. |
| 5,178,654 | A | 1/1993 | Cowley et al. |
| 5,250,267 | A | 10/1993 | Johnson et al. |
| 5,328,359 | A | 7/1994 | Retallick |
| 5,336,791 | A | 8/1994 | Jennings et al. |
| 6,231,648 | B1 | 5/2001 | Marlowe |
| 6,657,079 | B1 | 12/2003 | Mitsumoto et al. |
| 6,713,036 | B1 | 3/2004 | Vanden Bussche et al. |
| 6,840,256 | B1 | 1/2005 | Ryan et al. |
| 6,953,495 | B2 | 10/2005 | Schwab |
| 7,108,838 | B2 | 9/2006 | McGee |
| 2003/0021182 | A1 | 1/2003 | Illy et al. |
| 2003/0175183 | A1 | 9/2003 | Guetlhuber |
| 2004/0062689 | A1 | 4/2004 | Gauthier et al. |
| 2006/0036106 | A1 | 2/2006 | Mazanec et al. |
| 2006/0231645 | A1 | 10/2006 | Chan |

FOREIGN PATENT DOCUMENTS

| | | |
|---|---|---|
| EP | 0006734 | 1/1980 |
| EP | 0026827 | 4/1981 |
| EP | 1705167 | 9/2006 |
| EP | 1726355 | 11/2006 |
| GB | 672446 | 5/1952 |
| GB | 705176 | 3/1954 |
| GB | 1262436 | 2/1972 |
| GB | 1368922 | 10/1974 |
| GB | 2009174 | 6/1979 |
| GB | 2357318 | 6/2001 |
| JP | 55061927 A | 5/1985 |
| JP | 55064579 A | 5/1985 |
| TW | 590803 | 6/2004 |
| WO | WO01/85873 | 11/2001 |
| WO | WO2007/045457 | 4/2007 |
| WO | WO2009/078897 | 6/2009 |
| WO | WO2009/078898 | 6/2009 |
| WO | WO2009/078900 | 6/2009 |
| WO | WO2009/102311 | 8/2009 |

OTHER PUBLICATIONS

PCT International Preliminary Report on Patentability, PCT International Application No. PCT/US2008/012716, mailed Jun. 24, 2010.
PCT International Preliminary Report on Patentability, PCT International Application No. PCT/US2008/012714, mailed Jun. 24, 2010.
U.S. Appl. No. 12/678,257, Low Shear Gas Mixer, filed Mar. 15, 2010.
U.S. Appl. No. 12/678,263, Wet Scrubbing for Removing Particulate Solids From Oxygen Supply Line, filed Mar. 15, 2010.
U.S. Appl. No. 12/678,274, Hydrocarbon/Oxygen Industrial Gas Mixer With Water Mist, filed Mar. 15, 2010.
U.S. Appl. No. 12/678,276, Hydrocarbon/Oxygen Industrial Gas Mixer With Coarse Water Droplet Environment to Reduce Ignition Potential, filed Mar. 15, 2010.
PCT International Search Report, PCT International Application No. PCT/US2008/012587, mailed Feb. 10, 2009.
PCT International Search Report, PCT International Application No. PCT/US2008/012716, mailed Oct. 5, 2009.
PCT International Search Report, PCT International Application No. PCT/US2008/012715, mailed Feb. 3, 2009.
PCT International Search Report, PCT International Application No. PCT/US2008/012714, mailed Mar. 10, 2009.
PCT International Search Report, PCT International Application No. PCT/US2008/012586, mailed Feb. 11, 2009.
PCT Written Opinion, PCT International Application No. PCT/US2008/012587, mailed Feb. 10, 2009.
PCT Written Opinion, PCT International Application No. PCT/US2008/012716, mailed Oct. 5, 2009.
PCT Written Opinion, PCT International Application No. PCT/US2008/012715, mailed Nov. 19, 2009.
PCT Written Opinion, PCT International Application No. PCT/US2008/012714, mailed Mar. 10, 2009.
PCT Written Opinion, PCT International Application No. PCT/US2008/012586, mailed Feb. 11, 2009.
PCT International Preliminary Report on Patentability, PCT International Application No. PCT/US2008/012587, mailed Feb. 22, 2010.
PCT International Preliminary Report on Patentability, PCT International Application No. PCT/US2008/012586, mailed Feb. 22, 2010.
Burkholz, Armin, "Droplet Separation", 1989, pp. 180-182, VCH Publishers, New York, NY.
U.S. Appl. No. 12/678,274, Office Action mailed Jul. 16, 2012.
U.S. Appl. No. 12/678,276, Office Action mailed May 15, 2012.
U.S. Appl. No. 12/678,257, Response to Office Action mailed Mar. 16, 2012, filed Jun. 15, 2012.
U.S. Appl. No. 12/678,257, Office Action mailed Aug. 17, 2012.
U.S. Appl. No. 12/678,257, Office Action mailed Mar. 16, 2012.

* cited by examiner

OXYGEN/HYDROCARBON RAPID (HIGH SHEAR) GAS MIXER, PARTICULARLY FOR THE PRODUCTION OF ETHYLENE OXIDE

CROSS-REFERENCE TO RELATED APPLICATIONS

This application is a U.S. National Phase of International Application No. PCT/US2008/012714, filed Nov. 12, 2008, which claims priority to U.S. Provisional Application No. 61/007,790, filed Dec. 14, 2007, all of which are herein incorporated by reference in their entirety.

BACKGROUND

This invention relates generally to a gas mixer for mixing two gas streams. The disclosure is particularly suited to a gas mixer for mixing a hydrocarbon-containing gas stream with an oxygen-containing gas stream. The disclosure features a design of a gas mixer which minimizes the potential for ignition of the two gases in the mixer. An example of where this invention has utility is gas mixers used in the industrial production of ethylene oxide.

The chemical compound ethylene oxide (chemical formula $C_2H_4O$) is an important industrial chemical used as an intermediate in the production of ethylene glycol (the main component of automotive antifreeze) and other chemicals. Ethylene oxide is also used as a sterilant for foods and medical supplies. It is a colorless flammable gas at room temperature, and can be cooled and stored as a liquid.

Ethylene oxide first achieved industrial importance during World War I as a precursor to both ethylene glycol and the chemical weapon mustard gas. In 1931, Theodore Lefort, a French chemist, discovered a means to prepare ethylene oxide directly from ethylene and oxygen, using silver as a catalyst. Since 1940, almost all ethylene oxide produced industrially has been made using this method.

In current industrial processes, ethylene oxide is produced when ethylene ($CH_2=CH_2$) and oxygen ($O_2$) react on a silver catalyst at 200-300° C. showing large Ag nanoparticles supported on Alumina. Typically, chemical modifiers such as chlorine are also included. Pressures used are in the region of 1-2 MPa. The chemical equation for this reaction is:

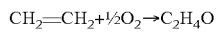

$$CH_2=CH_2+\tfrac{1}{2}O_2 \rightarrow C_2H_4O$$

In ethylene oxide production systems, a gas mixer is used to mix the hydrocarbon and oxygen gas streams just upstream of the reaction chamber where the silver catalyst is present. The gas mixer is typically constructed in the form of a vessel or pipe. The vessel includes an inlet manifold for each of the two gases. The vessel is sometimes constructed with a main outer pipe containing the hydrocarbon-containing gas stream and internal concentric tubes or "fingers" which contain the oxygen stream. Mixing occurs at the point where the internal tubes end, where the oxygen gas flowing out of the fingers meets the main stream of hydrocarbon-containing gas flowing in the outer tube. This basic design is described in U.S. Pat. No. 3,706,534.

The art has long recognized that there is a risk of ignition of a hydrocarbon-containing gas stream (e.g., a stream of gas containing for example ethylene mixed with other hydrocarbon gases) at the point where it is combined with an oxygen gas in a gas mixer. Ignition can occur when a particle (e.g. a piece of sand, rust or pipe scale) entrained in the hydrocarbon or oxygen gas stream strikes a metallic surface in the mixer, e.g., the wall of the mixer, thereby producing a spark. If the spark occurs in the hydrocarbon stream in the highly flammable zone e.g., at, or close to, the point of mixing of the two gas streams, ignition can occur. The ignition damages the gas mixer and also requires an interrupt of production to suppress the ignition and allow the gas mixer to cool before recommencing production. The flammable region is confined to the mixing zone of the two gases. The hydrocarbon-containing gas as well as the reactor feed blend are below the lower $O_2$ flammability limit—i.e., too rich to burn.

The art has devised a variety of gas mixer designs. Some of the designs are specifically directed to reducing the risk of ignition of hydrocarbon and oxygen gas stream. The known prior art includes the following patent documents, in addition to the above-cited '534 patent: U.S. Pat. Nos. 4,573,803; 3,702,619; 4,256,604; 4,415,508; 6,657,079; U.S. 2003/0021182; U.S. Pat. Nos. 3,518,284; 4,390,346; 3,237,923; 3,081,818; 2,614,616 and 6,840,256.

Production of ethylene oxide is but one example of an industrial process where a hydrocarbon-containing gas stream is mixed with an oxygen-containing gas stream, and where steps to avoid unintentional ignition of the hydrocarbon-containing gas stream are needed. Many other examples exist, some of which are mentioned in the above-cited patent documents. The features of this disclosure are applicable broadly to mixing of two gases, and should not be considered limited to hydrocarbon-oxygen gas mixing or the production of ethylene oxide.

SUMMARY

In a first aspect, a gas mixer is disclosed which includes a vessel (e.g., barrel or pipe) containing a stream of a first gas, e.g., a hydrocarbon-containing gas containing, for example, ethylene. The gas mixer includes a hollow pipe or finger located internal to the vessel containing a stream of a second gas, e.g., a stream of oxygen-containing gas such as pure oxygen or air enriched with oxygen. The internal pipe includes a peripheral end, an external surface, and defines a longitudinal axis. The internal pipe further includes a mixer tip at the peripheral end thereof. The mixer tip includes a body having an internal passage for conducting the second gas out of the pipe and an opening introducing the second gas stream 5, into the first gas stream in a radial direction relative to the longitudinal axis of the pipe. The pipe further includes a deflector on the external surface of the hollow pipe in longitudinal alignment with the opening of the mixer tip. The deflector serves to deflect any entrained particles within the first gas stream away from the trajectory of the second gas stream where it mixes with the first gas stream. In a hydrocarbon/oxygen gas stream embodiment, the design of the mixer tip and the deflectors minimizes the risk of ignition of the hydrocarbon-containing gas stream.

A second aspect of this disclosure is directed to a novel mixer tip adapted to be attached to the end of a hollow pipe having a longitudinal axis containing a stream of gas. The mixer tip includes a body having a plurality of wings, each of the wings having an internal passage having a first end and a second end forming an opening for ejecting the stream of gas. The internal passages of the wings may be lined with a spark-resistant material such as a ceramic coating, sapphire, Teflon or other material so as to inhibit sparking in the event that entrained particles in the gas stream strike the internal passages of the wings.

A further aspect of this disclosure is directed to a gas mixing system. The mixing system includes a plurality of vessels (e.g., pipes), each containing a stream of a first gas (e.g., hydrocarbon-containing gas). A hollow pipe or finger is concentrically located internal to the vessels and contains a stream of a second gas (e.g., oxygen-containing gas). The internal pipes have a peripheral end, an external surface and define a longitudinal axis. Each of the internal pipes includes (1) a mixer tip at the peripheral end thereof, the mixer tip comprising a body having an internal passage for conducing the second gas out of the hollow pipe and an opening introducing the second gas stream into the first gas stream in a radial direction relative to the longitudinal axis, and (2) a deflector on the external surface of the hollow pipe in longitudinal alignment with the opening of the mixer tip.

In yet another aspect, a method of mixing a hydrocarbon-containing gas stream with an oxygen-containing gas stream is disclosed. The method includes the steps of: flowing the hydrocarbon-containing gas stream through a vessel; flowing the oxygen-containing gas stream through a pipe located internally within the vessel; directing the oxygen-containing gas stream out of the pipe into the hydrocarbon-containing gas stream as a plurality of individual gas streams, each of the individual gas streams oriented in a radial direction relative to a longitudinal axis of the internal pipe; and deflecting any entrained particles contained in the hydrocarbon-containing gas stream away from the location where the individual gas streams initially meet the hydrocarbon-containing gas stream, thereby reducing the risk of ignition of the hydrocarbon-containing gas stream. In preferred embodiments, the deflecting step is performed by deflectors located on the external surface of the pipe. The pipe is fitted with a mixer tip forming N individual gas streams (N being an integer of 2 or more), and wherein there are N deflectors located on the external surface of the second gas pipe, each of which is in alignment with the N individual gas streams. In another embodiment, the N gas streams are released from the mixer tip from openings formed in wings projecting from the mixer tip. In one specific embodiment illustrated below, N is equal to 4, but N can of course be greater.

BRIEF DESCRIPTION OF THE DRAWINGS

FIG. 1 is an illustration of a high shear gas mixer design in accordance with one representative embodiment of the invention. While FIG. 1 shows a single oxygen finger with associate mixer tip located internal or within a vessel or pipe containing a hydrocarbon-containing gas stream, several of such fingers may be used in parallel within an individual vessel. Further, a gas mixing system may incorporate multiple vessels, each having one or more of the oxygen finger and mixer tips of FIG. 1.

DETAILED DESCRIPTION

This disclosure provides for a gas mixer for continuous-flow mixing of two pressurized gases. One gas is mixed with the other gas using a concentric pipe arrangement. The gas mixer is particularly useful in the mixing of an oxygen-containing stream, particularly high-purity oxygen, into a hydrocarbon stream. The gas mixer is most particularly useful for mixing oxygen into a gas stream containing, among other gases, ethylene in an ethylene oxide plant.

Figure 1:
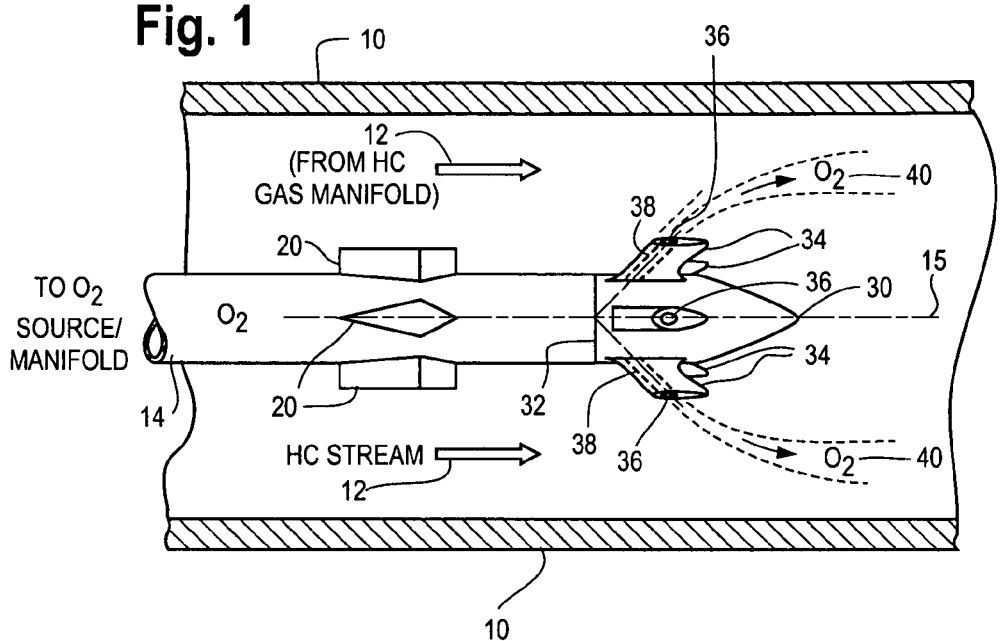

FIG. 1 is an illustration of a high shear gas mixer design in accordance with one representative embodiment of the disclosure. The gas mixer features a first vessel or pipe 10 which contains a pressurized hydrocarbon-containing gas stream 12 supplied from a hydrocarbon gas manifold, not shown in FIG. 1. An internal concentrically located pipe (oxygen finger) 14 is placed within the pipe 10 which contains a stream of pressurized oxygen gas. The internal pipe 14 defines a longitudinal axis 15.

A gas mixer tip 30 is welded or otherwise affixed onto the peripheral end of the pipe 14. The pipe 14 has an exterior surface shown in FIG. 1, to which are mounted a plurality of deflectors 20. Each of the deflectors 20 are located in alignment with openings 36 formed in the mixer tip 30. The mixer tip is shown isolated in FIGS. 2-5. The mixer tip 30 includes a solid body in the shape of a cone. The mixer tip 30 is fastened e.g. by welding, to the end 32 of the pipe 14. The mixer tip 30 may be machined from a solid block of metal such as Inconel alloy using CNC machining techniques. Other suitable metals include metals which are velocity exempt for oxygen service, including Inconel, Monel, Brass, and Alloy 20, among others. The mixer tip 30 has a plurality of wings 34 projecting from the exterior surface thereof. The wings 34 each have an internal passage 38 which has one end 37 (FIG. 3) in fluid communication with the internal passage of the pipe 14 and a second end or opening 36 oriented at an angle such that oxygen gas exits the mixer tip in a radial plane oriented at an acute angle relative to the axis 15. The acute angle $\alpha$ (FIG. 5) has values of between 30 and 60 degrees in preferred embodiments. The wings have peripheral edges 46 (FIG. 2) which are preferably flat and oriented parallel to the axis 15 of the internal pipe 14.

Figure 2:
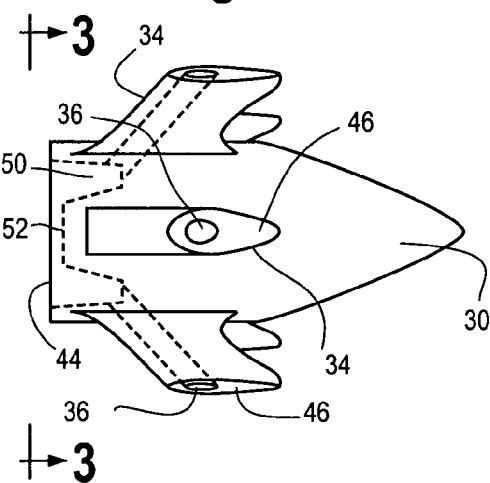
FIG. 2 is an isolated, side view of the mixer tip of FIG. 1.
Figure 3:
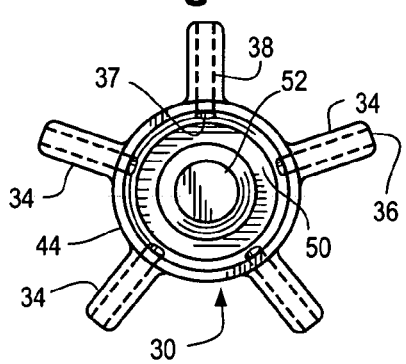
FIG. 3 is an isolated, end view of the mixer tip of FIG. 2 seen in the direction 3-3 of FIG. 2.
Figure 4:
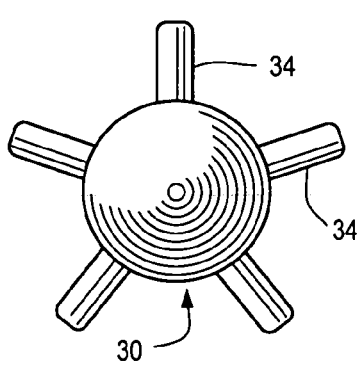
FIG. 4 is an isolated end view showing the opposite end of the mixer tip from FIG. 2.

FIG. 3 is an end view of the mixer tip 30 seen from the direction of the pipe, in the direction 3-3 of FIG. 2. The mixer tip includes a central hub or raised portion 52, and a ring-shaped recessed region 50 which acts as a manifold for supplying the oxygen gas to the openings 37 at the base of the passages 38. The rim 44 of the mixing tip 30 provides a surface for welding the mixing tip 30 onto the end 32 of the pipe 14 (see FIG. 1). Note that the number of wings (N) may be any number, for example 2, 3, 4, 5 or even more. The wings 34 are equidistantly spaced around the periphery of the mixing tip as shown in FIGS. 3 and 4. When the mixer tip is welded onto the end of the pipe 14, the mixer tip is aligned and oriented with respect to the pipe such that each one of the wings 34 is aligned with a respective deflector 20 positioned on the exterior surface of the pipe 14, thus resulting in alignment between the openings 36 in the periphery of the wings with the deflectors 20 to achieve the deflection features described herein.

Oxygen gas exits the openings 36 in the tip of the wings 34 and mixes with the hydrocarbon-containing gas stream 12 in a mixing zone shown as 40 in FIG. 1. The mixing zone 40 represents the area where highly flammable mixtures exist where the two gases meet. The deflectors 20 mounted to the exterior of the oxygen finger 20 serve to deflect any entrained particles, such as rust or scale, in the hydrocarbon-containing gas stream 12 away from the mixing zones 40, thereby reducing the possibility of ignition of the flammable zone.

While FIG. 1 show a single oxygen finger 14 with an associated mixer tip 30 located concentrically within a vessel or pipe 10 containing a hydrocarbon-containing gas stream 12, several of such fingers 14 (and associated mixer tip 30) may be used in parallel within an individual vessel or pipe 10.

Figure 6:
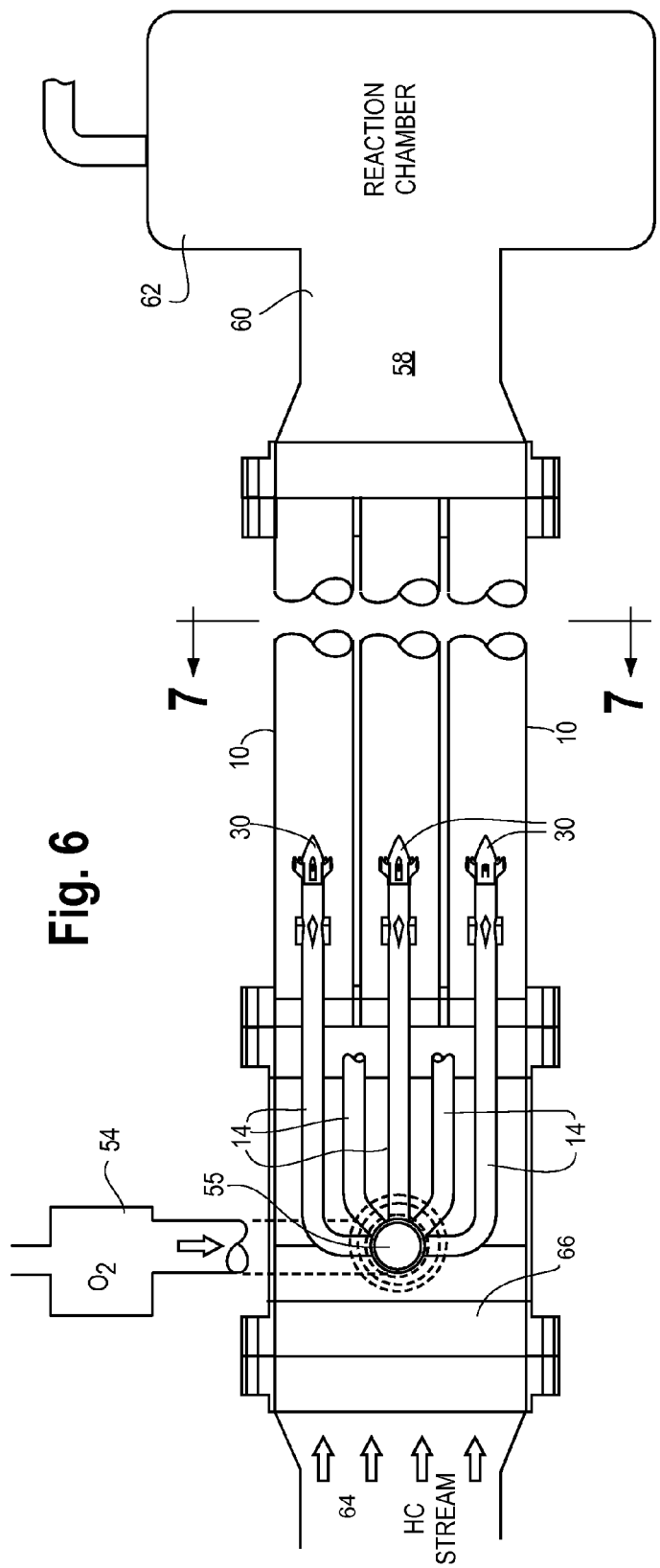
FIG. 6 is a schematic illustration of gas mixing system using the mixer design of FIG. 1 and the mixer tip of FIGS. 2-5.

In this configuration, the several oxygen fingers 14 would typically be oriented about a central longitudinal axis of the pipe 10. Furthermore, a gas mixing system may incorporate multiple vessels 10, each having one or more of the oxygen fingers 14 and mixer tips 30 of FIG. 1. An example of such a gas mixing system is shown in FIG. 6 and will be described subsequently.

Thus, from FIGS. 1-5, it will be seen that in the present concentric pipe arrangement of FIG. 1, radial holes 36 are provided in the inner concentric pipe (oxygen finger) 14 for egress of the second gas (e.g., oxygen) into the first gas stream 14 (e.g., ethylene). The inner concentric pipe 14 incorporates several novel features in the form of a novel mixer tip 30, described herein, and deflectors 20 on the exterior of the oxygen finger 14. These features serve various functions, including (1) directing the second gas stream (oxygen) into the core of the first gas stream 12 flow in a high shear manner, promoting rapid mixing in the mixing zone 40 and rapid dissolution of high oxygen concentrations in the mixing zone and resulting reduced areas where ignition is possible, (2) minimizing the energy release of particle impact in the vicinity of the radial holes 36 in the mixer tip, thereby reducing the risk of ignition of the mixed gas streams, (3) and directing the first gas stream 12 and any entrained particles contained therein away from the radial holes 36 of the mixer tip 30. The inner concentric pipe 30 may also optionally include structures (not shown but conventional) for minimizing vibration of the inner concentric pipe 14 relative to the outer pipe or vessel 10.

Figure 5:
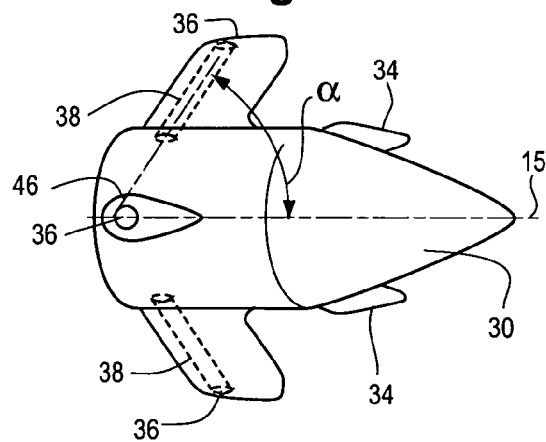
FIG. 5 is an isolated, perspective view of the mixer tip of FIGS. 2-4.

Furthermore, the flow path features within the mixer tip 30 pipe serve to mitigate the effects of impact of a particle in the oxygen gas stream which might potentially cause ignition of the mixed gas stream. In particular, as can be seen in FIGS. 1 and 5, the internal passage 38 within the wings is oriented an acute angle α relative to the longitudinal axis 15 of the pipe, with a preferably having a value of between 30 and 60 degrees. The angle serves to minimize the kinetic energy of the particle impact. Furthermore, the walls of the passages 38, and the area of the mixer tip in the vicinity of the openings 36, are preferably lined with a spark-suppressing material such as sapphire, oxide-based ceramic liners, Teflon or the like to further minimize the likelihood of producing a spark and to prevent hot-spot formation at the rim of the openings 36.

A second feature of the inner concentric pipe 14 is the deflectors 20 positioned on the exterior walls of the pipe 14 feature upstream of the openings 36 which direct any entrained particles contained in the hydrocarbon stream away from the high velocity oxygen plumes (i.e., the mixing trajectory 40 of the oxygen after it meets the hydrocarbon gas stream) and reduces the probability of particles entering the highest fluid shear zone immediately downstream of the openings 36. As noted above, attachments to the inner concentric pipe may be installed to minimize vibration of the inner pipe relative to the outer vessel or pipe.

In a further optional embodiment, the design of the oxygen flow path of the mixing device is such that it eliminates right-angle turns of the oxygen stream in the vicinity of point where the oxygen stream is mixed with the hydrocarbon stream to minimize ignition of the hydrocarbon stream due to impact of particles entrained in the oxygen gas stream. This is achieved by providing the passages 38 at an acute angle relative to the axis 15 of the inner pipe 14. Good mixing is achieved by the oxygen mixing trajectory that is removed from the walls of both the inner concentric pipe 14 and outer pipe or vessel 10.

The gas mixer of this disclosure is particularly suited to industrial gas mixing applications in which an oxygen scrubbing device is placed in the oxygen supply system upstream of the gas mixer of FIG. 1. Such a scrubbing system should be designed to reduce the number of particles entering the mixing zone from the oxygen supply. A preferred wet scrubbing system for a oxygen gas stream is described in WO 2009/078900, entitled "Wet Scrubbing For Removing Particulate Solids From Oxygen Supply Lines," the content of which is incorporated by reference herein.

One possible configuration of the inventive gas mixer system of this disclosure is shown in FIG. 6. A hydrocarbon-containing gas is collected from a source via a pipe 64 and supplied to a manifold 66. A multitude of outer pipes 10 receive hydrocarbon-containing gas from the manifold 66. Oxygen gas is supplied from a source 54 to a manifold 55 where the oxygen gas is fed to individual oxygen gas fingers 14, each placed within a respective outer pipe 10. The gas fingers 14 are concentrically located within the pipes 10. Each gas finger 14 is of the construction of FIGS. 1-5 and functions as described above. At the end of the pipe 10 the mixed gases are collected in a region 58 and are routed via a pipe 60 to the next device, in particular to a reaction chamber 62 where a chemical reaction between the gases occurs. The catalyst (e.g., silver catalyst in an ethylene oxide reaction) is present in the reaction chamber 62. The reaction products are supplied from the reaction chamber to downstream reaction vessels or to storage facilities in conventional manner. The inner oxygen finger 14 for adding the high purity oxygen gas to the hydrocarbon-containing gas stream in the pipes 10 is designed to prevent stagnant and/or back-mixed zones which could support ignitions. The selected material of construction for the mixing device considers minimization of ignition from particle impact when handling pure oxygen.

Figure 7:
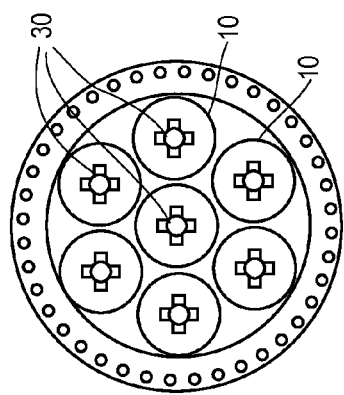
FIG. 7 is a cross-section through the gas mixing system of FIG. 6 along the lines 7-7 of FIG. 6.

FIG. 7 is a cross-section of the gas mixer of FIG. 6 showing the outer pipes 10 and mixer tips 30 at the end of the of oxygen pipes.

From the above discussion, it will be appreciated that a method of mixing a hydrocarbon-containing gas stream 12 with an oxygen-containing gas stream has been described, comprising the steps of:

flowing the hydrocarbon-containing gas stream 12 through a vessel 10;

flowing the oxygen-containing gas stream through a pipe 14 concentrically located within the vessel 10 (FIGS. 1 and 6);

directing the oxygen-containing gas stream out of the pipe into the hydrocarbon-containing gas stream as a plurality of individual gas streams 40 (FIG. 1), each of the individual gas streams oriented in a radial direction relative to the longitudinal axis of the pipe (shown in FIG. 1, with the radial direction being due to the inclination of the passages 38 by angle α shown in FIG. 5); and deflecting any entrained particles contained in the hydrocarbon-containing gas stream away from the location where the individual gas streams initially meet the hydrocarbon-containing gas stream (by means of the deflectors 20), thereby reducing the risk of ignition of the hydrocarbon-containing gas stream with the oxygen-containing gas stream.

In the embodiment of FIGS. 1 and 6, the deflecting step is performed by deflectors 20 located on the external surface of the pipe 14. In the embodiment of FIGS. 2-5, the end of the pipe 14 is fitted with a mixer tip forming N individual gas streams (N=5 in the embodiment of FIGS. 2-5), and there are N deflectors 20 located on the external surface of the pipe 14, each of which is in alignment with the N individual gas streams. In the embodiments of FIGS. 1-6 the N gas streams are released from the mixer tip from openings 36 formed in wings 34 projecting from the mixer tip 30. In representative embodiments N is an integer greater than or equal to 4.

As noted above, in one preferred embodiment of the method the hydrocarbon-containing gas stream comprises a gas stream containing ethylene and other gases including methane, nitrogen and possibly others. In an EO production scenario, the ethylene content of the gas stream may be only about 30 percent or even less. The largest component is typically methane, which is considered an "inert" gas under process conditions. Additionally, the oxygen-containing gas stream can be a stream of pure oxygen, air enriched with oxygen, or merely a stream of air.

Preferred embodiments of the method include a further step of performing a wet scrubbing of the oxygen-containing gas stream upstream of where the oxygen-containing gas stream is introduced into the pipe 14, as mentioned previously.

While presently preferred embodiments have been described with particularity, variations from the specifics are possible without departure from the scope of the invention. For example, the shape of the wings and the mixer tip are not particularly critical and can vary considerably. All questions regarding scope are to be determined by reference to the appended claims.

We claim:

1. A gas mixer, comprising:
   a vessel containing a stream of a first gas,
   a hollow pipe located within the vessel and containing a stream of a second gas and having a peripheral end thereof, the pipe having an external surface and defining a longitudinal axis;
   wherein the pipe further comprises
   (1) a mixer tip at the peripheral end thereof, the mixer tip comprising a body having at least one internal passage for conducting the second gas out of the pipe and at least one opening introducing the second gas stream into the first gas stream in a radial plane at an acute angle relative to the longitudinal axis, and
   (2) at least one deflector on the external surface of the pipe in longitudinal alignment with the opening of the mixer tip.

2. The gas mixer of claim 1, wherein the mixer tip further comprises a plurality of wings, each of the wings having said internal passage having a first end in fluid communication with the peripheral end of the hollow pipe and a second end forming said opening for introducing the second gas stream into the first gas stream; and wherein the pipe includes said deflector in longitudinal alignment with each of the wings.

3. The gas mixer of claim 2, wherein the mixer tip comprises at least four of said wings and at least four of said deflectors.

4. The gas mixer of claim 2, wherein the wings are substantially evenly spaced around the mixer tip.

5. The gas mixer of claim 1, wherein the passages of the mixer tip are lined with a spark-suppressing material.

6. The gas mixer of claim 1, further comprising structures attached to the pipe for minimizing vibration of the pipe.

7. The gas mixer of claim 1, wherein the gas mixer comprises at least two of said pipes.

8. The gas mixer of claim 1, wherein the vessel containing the first gas stream is in the form of a pipe having a central longitudinal axis and wherein the hollow pipe is located substantially coincident with the central longitudinal axis.

9. The gas mixer of claim 1, wherein the mixer tip is machined from a solid block of metal.

10. A gas mixing system comprising:
    a plurality of vessels, each containing a stream of a first gas;
    a hollow pipe concentrically located within each of the vessels and containing a stream of a second gas and having a peripheral end thereof, the pipe having an external surface and defining a longitudinal axis;
    wherein each of the hollow pipes further comprises
    (1) a mixer tip at the peripheral end thereof, the mixer tip comprising a body having at least one internal passage for conducting the second gas out of the hollow pipe and at least one opening introducing the second gas stream into the first gas stream in a radial plane at an acute angle relative to the longitudinal axis, and
    (2) at least one deflector on the external surface of the hollow pipe in longitudinal alignment with the opening of the mixer tip.

11. The gas mixing system of claim 10, wherein each of the mixer tips further comprises a plurality of wings, each of the wings having said internal passage having a first end in fluid communication with the peripheral end of the associated pipe and a second end forming said opening for introducing the second gas stream into the first gas stream; and wherein each of the pipes includes said deflector in longitudinal alignment with each of the wings.

12. The gas mixing system of claim 10, wherein the passages of the mixer tips are lined with a spark-suppressing material.

13. The gas mixing system of claim 10, further comprising structures attached to the hollow pipes for minimizing vibration of the hollow pipes.

14. The gas mixing system of claim 10, further comprising a wet scrubber, wherein the second gas is an oxygen-containing gas, and wherein the wet scrubber supplies the oxygen-containing gas to each of the hollow pipes.

* * * * *